United States Patent
Sareyka (10) Patent No.: US 9,809,976 B2
(45) Date of Patent: *Nov. 7, 2017

(54) BEAM CLIP WITH TEETH

(71) Applicant: Worthington Armstrong Venture, Malvern, PA (US)

(72) Inventor: Brett W. Sareyka, Glen Mills, PA (US)

(73) Assignee: Worthington Armstrong Venture, Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/273,849

(22) Filed: Sep. 23, 2016

(65) Prior Publication Data

US 2017/0009451 A1    Jan. 12, 2017

Related U.S. Application Data

(60) Continuation of application No. 13/694,393, filed on Nov. 27, 2012, which is a division of application No. 12/806,909, filed on Aug. 24, 2010, now Pat. No. 8,413,402.

(51) Int. Cl.
| | |
|---|---|
| *E04B 9/02* | (2006.01) |
| *E04B 9/30* | (2006.01) |
| *E04B 9/12* | (2006.01) |
| *E04B 9/06* | (2006.01) |
| *F16B 7/04* | (2006.01) |
| *F16M 13/02* | (2006.01) |
| E04B 1/24 | (2006.01) |
| E04B 1/26 | (2006.01) |

(52) U.S. Cl.
CPC .............. *E04B 9/127* (2013.01); *E04B 9/068* (2013.01); *E04B 9/30* (2013.01); *F16B 7/0486* (2013.01); *F16M 13/027* (2013.01); *E04B 1/2403* (2013.01); *E04B 1/26* (2013.01); *E04B 9/02* (2013.01)

(58) Field of Classification Search
CPC . E04B 9/127; E04B 9/068; E04B 9/30; E04B 9/02; E04B 1/26; E04B 1/2403; E04B 2001/2415; E04B 1/2604; E04B 1/2612; E04B 2001/2644; E04B 9/10; E04C 3/32; E04C 5/00; E04C 5/01; F16B 7/0486; F16B 1/00; F16B 5/0692; F16B 5/0685; F16M 13/027

See application file for complete search history.

(56) References Cited

U.S. PATENT DOCUMENTS

| | | |
|---|---|---|
| 28,030 A | 4/1860 | Worthen |
| 1,412,163 A | 4/1922 | Buckingham |
| 1,920,276 A | 8/1933 | Richens |
| 2,101,378 A | 12/1937 | Wiskoff |
| 2,351,525 A | 6/1944 | Leary |
| 2,611,160 A * | 9/1952 | Hanesse ............... A63H 33/107 182/228.1 |
| 2,816,623 A | 12/1957 | Wong |

(Continued)

*Primary Examiner* — Phi A
(74) *Attorney, Agent, or Firm* — Stradley Ronon Stevens & Young, LLP (57) ABSTRACT

A saddle connector, having an inverted channel, engages a bulb of a beam in the grid of a suspended ceiling. The channel has hardened teeth staggered along the opposing walls of the channel. The teeth are forced into the bulb of the beam, one at a time, by the full force exerted by hand operated pliers.

5 Claims, 7 Drawing Sheets

(56) References Cited

U.S. PATENT DOCUMENTS

| | | | |
|---|---|---|---|
| 2,830,683 | A | 4/1958 | Griffith |
| 2,879,087 | A | 3/1959 | Haglund |
| 2,917,263 | A | 12/1959 | Appleton et al. |
| 2,973,175 | A | 2/1961 | Appleton |
| 3,020,602 | A | 2/1962 | Siering |
| 3,069,991 | A | 12/1962 | Ericson |
| 3,089,570 | A | 5/1963 | O'Neil, Jr. |
| 3,216,537 | A | 11/1965 | Nelsson |
| 3,232,021 | A | 2/1966 | Wilson |
| 3,294,428 | A | 12/1966 | Lickliter et al. |
| 3,329,387 | A | 4/1967 | Fischer |
| 3,440,947 | A | 4/1969 | Averill |
| 3,730,466 | A * | 5/1973 | Swanquist ............. H02G 3/125 220/3.9 |
| 3,752,512 | A | 8/1973 | Gilb |
| 3,809,358 | A | 5/1974 | Hazeley |
| 4,027,454 | A | 6/1977 | Schuplin |
| 4,033,083 | A | 7/1977 | Fritz et al. |
| 4,261,470 | A | 4/1981 | Dolan |
| 4,454,700 | A | 6/1984 | Kem |
| 4,464,876 | A | 8/1984 | Kem |
| 4,525,971 | A | 7/1985 | Kern |
| 4,561,230 | A | 12/1985 | Rionda et al. |
| 4,570,391 | A | 2/1986 | Quante et al. |
| 4,580,382 | A | 4/1986 | Judkins et al. |
| 4,580,387 | A | 4/1986 | Rogers |
| 4,621,473 | A | 11/1986 | Wendt |
| 4,738,071 | A | 4/1988 | Ezard |
| 5,279,090 | A | 1/1994 | Yamaguchi et al. |
| 5,349,800 | A | 9/1994 | Peng |
| 6,009,681 | A | 1/2000 | Kozloff |
| 6,101,780 | A | 8/2000 | Kreidt |
| 6,412,246 | B1 | 7/2002 | Tadich |
| 6,523,321 | B1 | 2/2003 | Leek et al. |
| 6,659,700 | B1 * | 12/2003 | Farrell .................... F16B 15/06 411/450 |
| 6,698,964 | B2 | 3/2004 | DaSilveira |
| 6,837,019 | B2 | 1/2005 | Collie |
| 6,866,458 | B2 * | 3/2005 | Farrell ................ F16B 15/0015 411/462 |
| 6,971,210 | B2 | 12/2005 | Kliegle et al. |
| 7,478,787 | B2 | 1/2009 | Bankston et al. |
| 7,614,195 | B2 | 11/2009 | Platt et al. |
| D611,332 | S | 3/2010 | Tedesco et al. |
| 7,748,190 | B1 * | 7/2010 | Loper ................. E04F 13/0864 411/466 |
| 7,770,349 | B2 | 8/2010 | Tedesco et al. |
| D638,289 | S | 5/2011 | Tedesco et al. |
| 8,046,966 | B2 | 11/2011 | Moore et al. |
| 8,250,827 | B2 | 8/2012 | Lin et al. |
| 8,303,228 | B2 * | 11/2012 | Gosis ..................... F16B 15/06 411/451.3 |
| 8,453,407 | B2 | 6/2013 | Tedesco |

\* cited by examiner

BEAM CLIP WITH TEETH

RELATED APPLICATION

This application claims the benefit of priority to U.S. patent application Ser. No. 13/694,393, filed on Nov. 27, 2012, which is a divisional of U.S. patent application Ser. No. 12/806,909 filed on Aug. 24, 2010, which issued as U.S. Pat. No. 8,413,402 on Apr. 9, 2013, the contents of which are incorporated in this application by reference.

BACKGROUND OF THE INVENTION

1. Field of the Invention

The invention generally relates to suspended ceilings that hang from structural ceilings, and more particularly, to connectors for the metal beams that form the grids in such suspended ceilings.

2. Prior Art

The beams in the grids of suspended ceilings are formed from a flat, continuous strip of sheet metal that passes through successive rolls. The rolls bend the strip into a cross section having a bulb at the top, a web depending downward from the bulb, and horizontal flanges, at the bottom, on opposite sides, of the web.

The beams are formed into a grid that can support panels in rectangular grid openings, or drywall sheets attached to the grid from below by self-tapping screws.

The beams in the grid are attached on each side of the grid to a molding on a side wall, generally by screws, but sometimes by a connector in the form of a saddle that is secured to the molding and beams by self-tapping screws. Such a saddle connector has an inverted channel that straddles the bulb of a beam, and is set in place from above the beam.

Such a saddle-type channel connector having on each side of the channel teeth that dig into the structural elements they straddle, have been used on wooden beams. On metal beams, the teeth of the connector generally bend and fail to penetrate the metal of the beam when force is applied, as by hand pliers, when the connector is being applied to the beam. Hence, such connectors have not been accepted in the suspended ceiling field where metal beams are used in the grids.

BRIEF SUMMARY OF THE INVENTION

The present invention utilizes a saddle connector, with teeth extending from sides of the channel, that bite into the bulb of a metal beam to connect the beam to a wall molding, or to another metal beam, in a ceiling grid. The saddle connector straddles the bulb in a beam, and the teeth bite into the bulb of the beam when force is applied to the teeth, with hand pliers, to force the teeth, one at a time, into the bulb.

The saddle connector is made of hardened steel, with sharp, pointed teeth stamped out of the sides of the saddle. The teeth are positioned in the connector so they can be pinched into the metal bulb of the beam with ordinary hand operated pliers, such as "tongue and groove" pliers, one at a time. One jaw of the pliers can abut against the connector on the opposite side of the channel from the tooth being inserted, without interference from any teeth not yet inserted, and pinch one opposite hardened sharp tooth on the other side of the connector channel, into the bulb of the beam.

In this manner, the full force being applied by the installer, with the mechanical advantage created by the pliers, can be concentrated on one tooth at a time, to overcome the substantial resistance to penetration offered by the beam. The hardened tooth in turn, does not bend, so the tooth is forced into the beam The connector of the invention can be applied quickly and permanently to provide a firm connection. In seismic prone areas, self-tapping screws can be inserted through the clip into the beam to provide added strength.

BRIEF DESCRIPTION OF SEVERAL VIEWS OF THE DRAWING

FIGS. 2 through 5 show a first embodiment of the invention.

FIGS. 7 through 10 show a second embodiment of the invention.

DETAILED DESCRIPTION OF THE INVENTION

Suspended ceilings, as seen, for instance, in U.S. Pat. Nos. 6,523,313 and 6,138,416, incorporated herein by reference, have a grid of interconnected beams. The grid supports panels on flanges of the beams, in grid openings, in panel ceilings. In drywall ceilings, sheets of wallboard are secured to the bottom of the flanges of the beams in the grid, by self-tapping screws. The grid is suspended from a structural ceiling by hang wires.

The present invention deals primarily with saddle connectors that secure the beams of the grid to wall molding that surrounds the grid, or to connect beams in the grid to each other.

The Prior Art

Figures 1, 2:
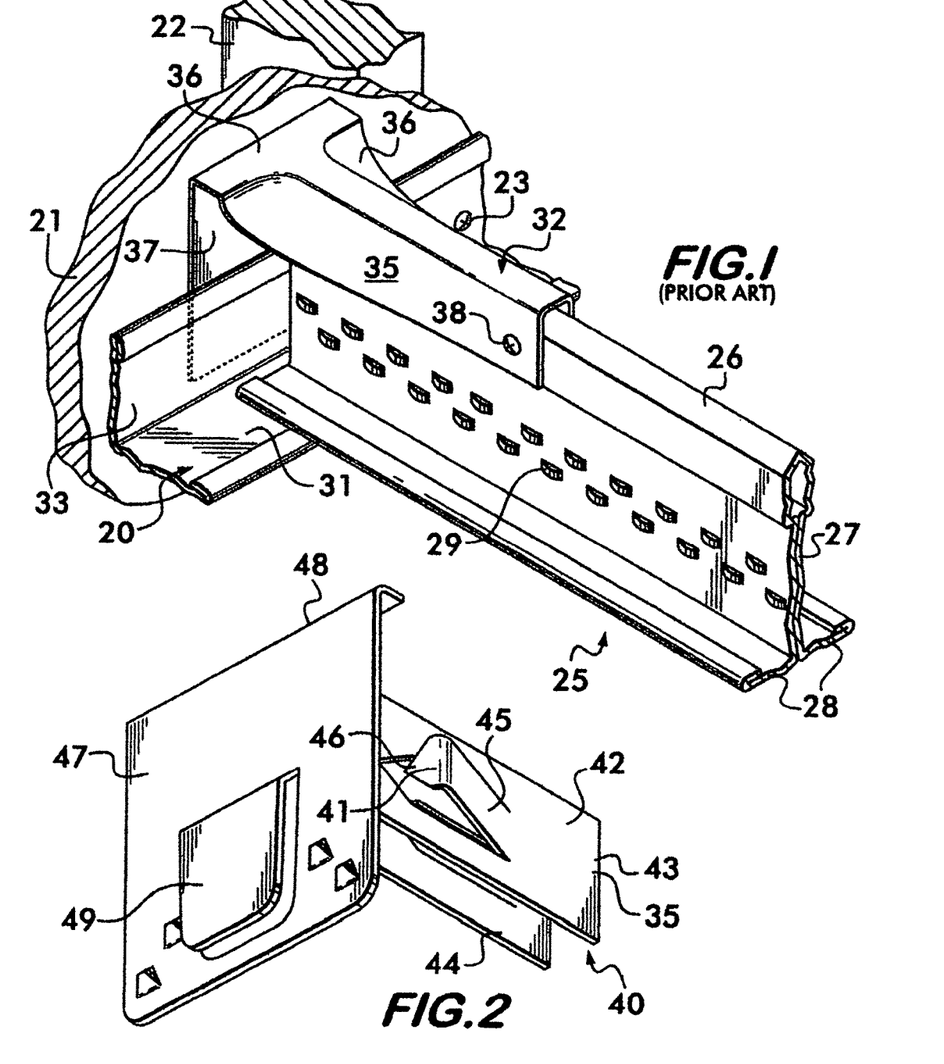
FIG. 1 is a perspective view of a prior art saddle connector attached to a beam by screws.
FIG. 2 is a perspective view of a saddle connector of the invention.

In the prior art, as seen in FIG. 1, an angle wall molding 20 is secured to side wall 21, and wall stud 22, by screws 23. A beam 25, rollformed from a continuous web of sheet metal, has a bulb 26, a web 27 depending downward from the bulb 26, and horizontal flanges 28 extending oppositely from the web 27 at the bottom. Stitches 29 secure layers of the web 27 of the beam 25 together.

The beam 25, which forms part of the grid referred to above, rests, at its end, on the horizontal ledge 31 of the wall molding 20. A prior art saddle connector 32 secures the end of beam 25 to the vertical leg 33 of wall molding 20, to keep the beam 25 in place on the molding 20. An inverted channel 35 straddles the bulb 26. The channel 35 flares out at one end 36 to form a downwardly, extending flat portion 37 that hooks over the vertical leg 33 of wall molding 20. A self-tapping screw 38 secures the prior art saddle connector 32 to bulb 26.

The Invention

The saddle connector 40 of the invention uses hardened, staggered teeth 41, instead of screws 23, to bite into the bulb 26 of beam 25 to secure the inverted channel 42 to the bulb 26 of the beam 25.

The teeth 41 are punched out of the opposing side walls 43 and 44 of the inverted channel 42 of saddle connector 40, and have a pivot leg 45, and a pointed segment 46.

The backpiece 47, as seen in FIG. 2, is bent downwardly from a bridge piece 48 that extends from inverted channel 42. The backpiece 47 has punched from it a lip 49 that is hooked between side wall 21 and the vertical leg 33 of the wall molding 20, as seen, for instance, in the cross sectional view in FIG. 6.

Figure 3:
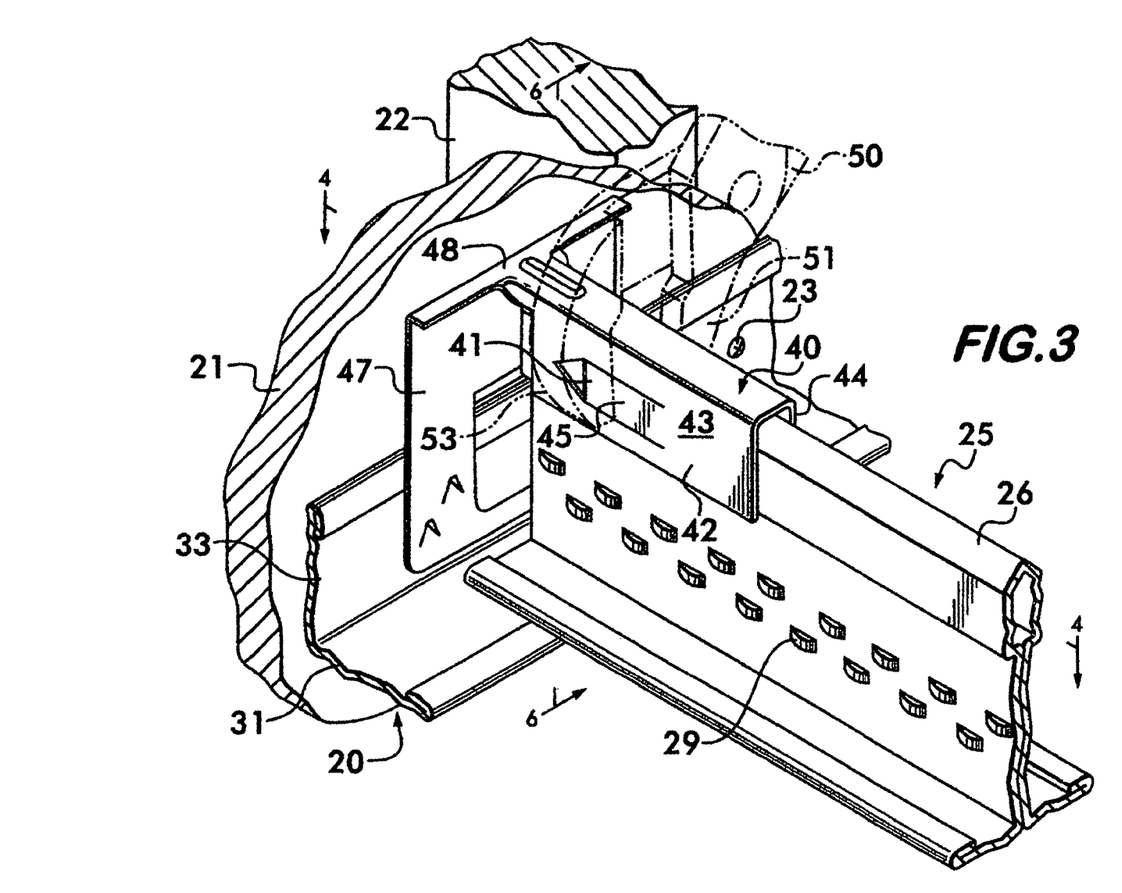
FIG. 3 is a perspective view of the saddle connector of FIG. 2 secured to the end of a beam in a grid, and hooked onto a wall molding.
Figure 4:
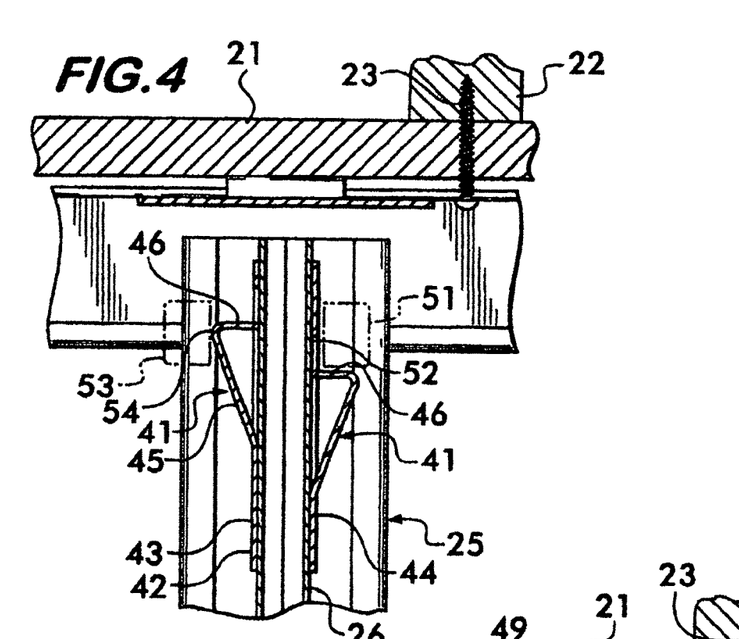
FIG. 4 is a sectional view taken on the line 4-4 of FIG. 3.
Figure 5:
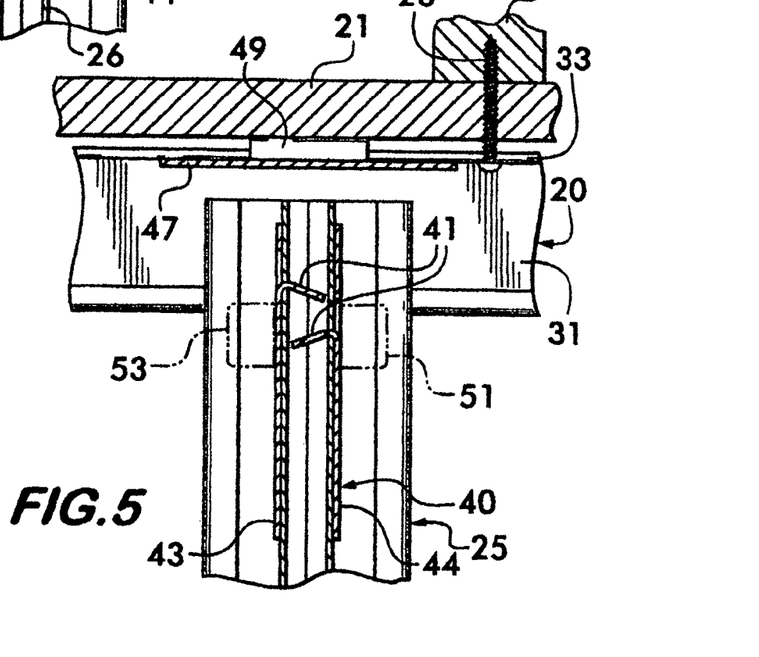
FIG. 5 is a view similar to FIG. 4 showing the teeth of the saddle connector embedded in the bulb of a beam in the grid.

As seen particularly in FIG. 4, the teeth 41 of the invention, are positioned initially outwardly from both opposing side walls 43 and 44 of the inverted channel 42, and are staggered relative to the tooth or teeth on the opposing wall. This permits pliers 50, shown in phantom in FIG. 3, to be applied in a manner wherein one jaw 51 of pliers 50 can seat on a channel side wall 44 at location 52, while the other jaw 53 of the pliers 50 can be applied to the pivot leg 45 of the tooth 41 on the opposing channel side wall 43 at location 54 as seen in FIG. 4. This permits the full leverage of the pliers 50 to be applied to one tooth 41 at a time, whereby the pointed segment 46 of a hardened tooth 41 penetrates the softer metal of the bulb 26 of the beam 25.

Figures 6, 7:
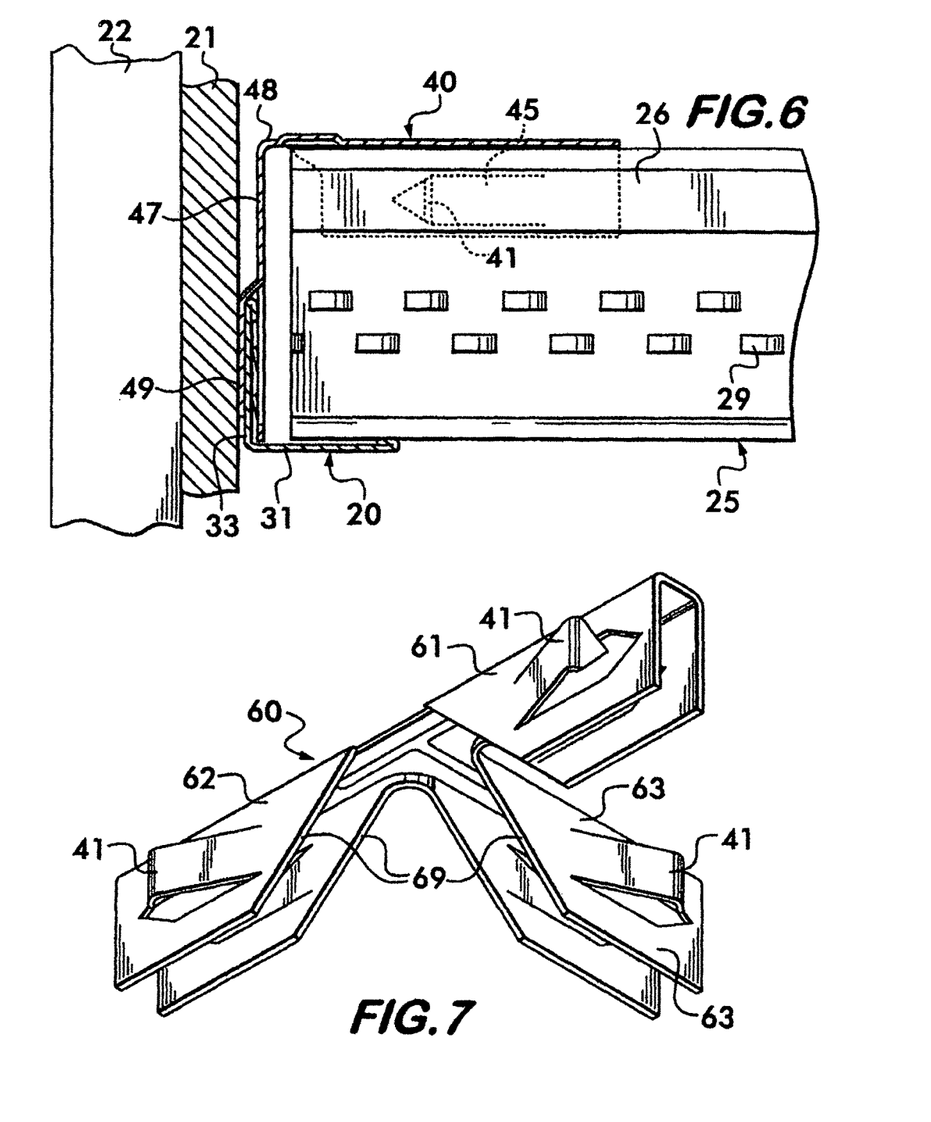
FIG. 6 is a sectional view taken on the line 6-6 of FIG. 3.
FIG. 7 is a perspective view of a T-shaped saddle connector of the invention.
Figure 8:
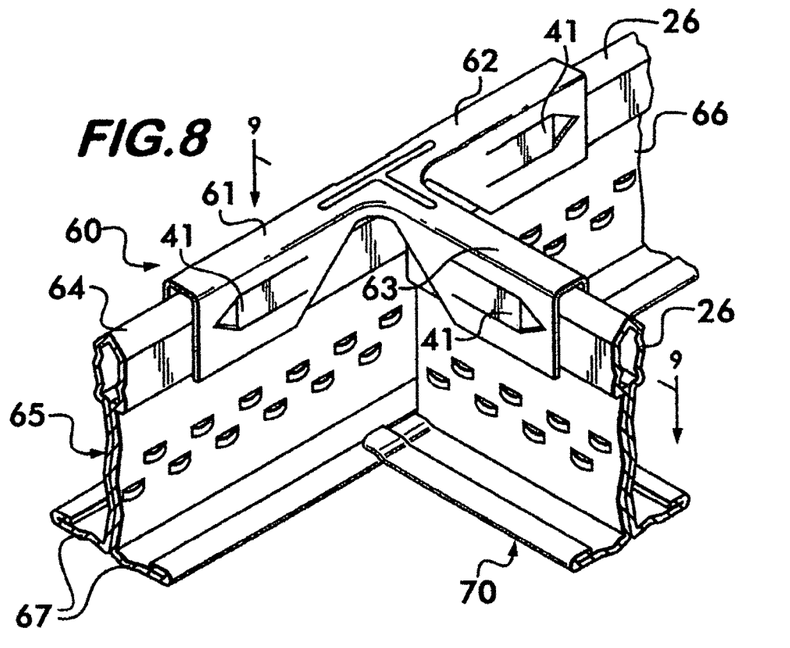
FIG. 8 shows the saddle connector of FIG. 7 securing a cross beam to a main beam, with the teeth pressed into both beams.
Figure 9:
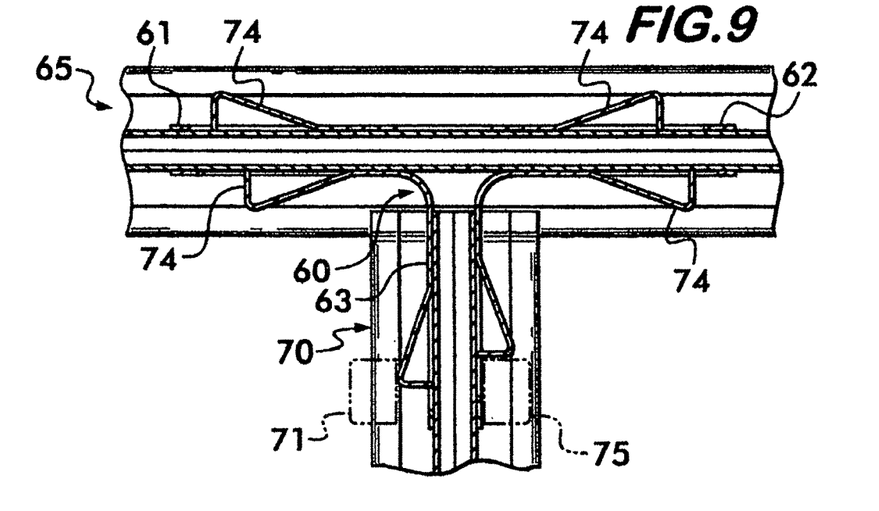
FIG. 9 is a view taken on the line 9-9 of FIG. 8, before the teeth are pressed into the beam.
Figure 10:
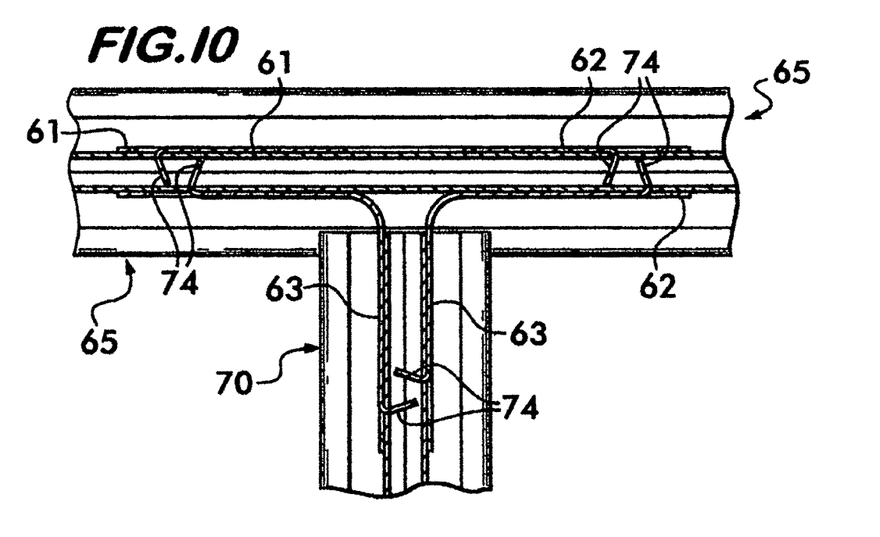
FIG. 10 is a view similar to FIG. 9, after the teeth have been pressed into the beam.

The saddle connector 40 of the invention can take other forms. In FIGS. 7, 8 and 9, there is shown the connector 60 of the invention used to connect a single cross beam 70 to a main beam 65. As seen, in the form shown in FIGS. 7, 8, and 9, connector 60 has in-line channels 61 and 62, and perpendicularly-extending channel 63. Channels 61 and 62 extend over bulb 64 of main beam 65, having web 66, flanges 67, and stitches 68.

Figure 11:
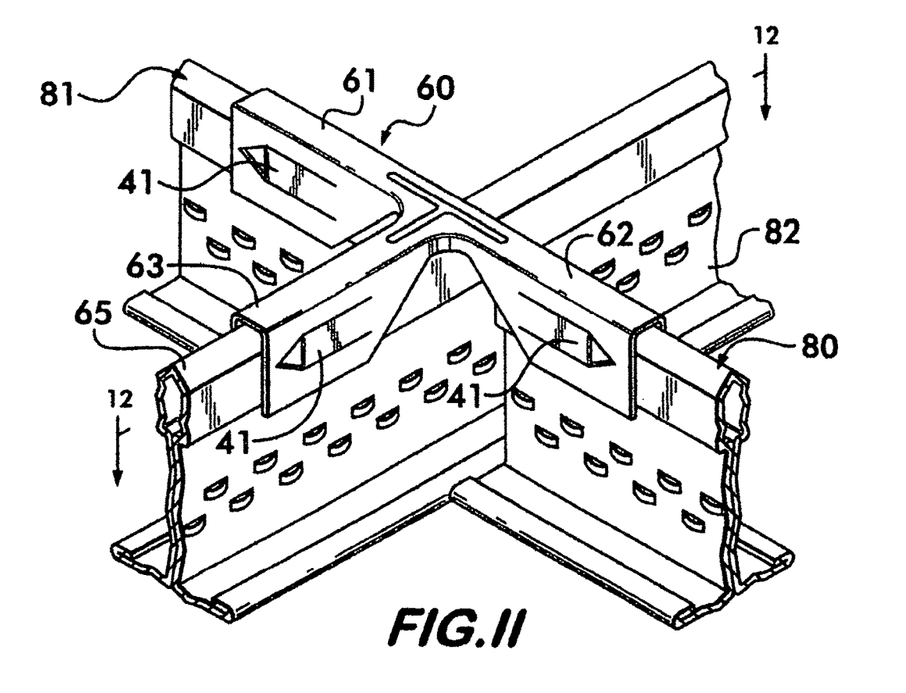
FIG. 11 shows the saddle connector of FIG. 7 used to connect opposing cross beams to a main beam.
Figure 12:
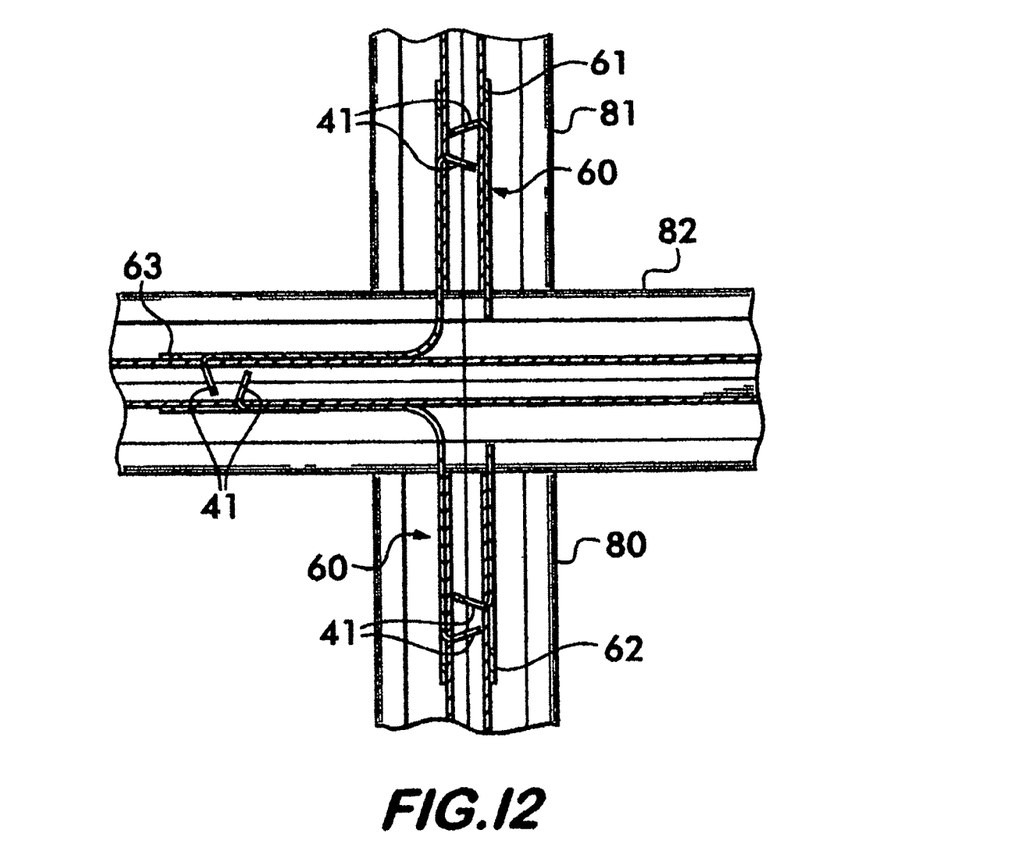
FIG. 12 is a sectional view taken on the line 12-12 in FIG. 11.

Cutouts 69 in channels 61, 62, and 63 permit connector to engage main beam 65 and cross beam 70 as shown particularly in FIG. 8. Teeth 71 are staggered longitudinally along channels 60, 61, and 62, so that the teeth do not oppose each other, whereby one jaw 71 of pliers 72 can seat at location 73 on the channel, while the other jaw 75 of pliers 72 can be applied to tooth 74. In FIGS. 11 and 12, there is shown the connector 60 of FIG. 7 used to connect opposing cross beams 80 and 81 to main beam 82. Channel 63 extends over main beam 65, while channels 61 and 62 extend over cross beams 80 and 81. As described above, a tooth 74 of hardened metal is forced into the bulb 26 of a beam 25, one at a time, whereby the full force of the hand pliers 72 is used most effectively on the tooth 74.

In the above manner, the teeth 41 are pierced into the bulb 26 of a beam 25 in the various embodiments disclosed above, resulting in a secure connection between and among beams in a suspended ceiling.

We claim:

1. A ceiling system comprising:
   a wall molding attached to a wall, the wall molding including a first vertical leg parallel to the wall and a second vertical leg perpendicular to the wall; and
   a saddle connector including:
   (a) a first inverted channel comprising a first sidewall and a second sidewall, the first sidewall opposing the second sidewall,
   (b) a first tooth in the first side wall that is opposite a first clear surface area on the second side wall, wherein the first tooth is adapted to be forced into the first inverted channel, thereby forming a second clear surface area on the first sidewalk,
   (c) a second tooth in the second side wall that is opposite the second clear surface area, such that the first tooth and the second tooth are staggered along the first and second sidewalls,
   (d) a bridge piece extending from the first inverted channel,
   (e) a back piece bent downwardly from the bridge piece, and
   (f) a lip punched out of the back piece, the lip adapted to hook between the wall and the first vertical leg of the wall molding to secure the saddle connector to the wall molding; and
   (g) a ceiling beam including a bulb along the top of the ceiling beam, wherein the first tooth and the second tooth pierce the bulb, wherein the first clear surface area is capable of forming a support for a first jaw of a pair of manually operated pliers to force the first tooth into the bulb by a force from a second jaw of the pair of manually operated pliers, the first tooth forming the second clear surface area once forced into the bulb, and the second clear surface area is capable of forming a support for the first jaw of the pair of manually operated pliers to force the second tooth into the bulb by a force from the second jaw of the manually operated pliers.

2. The ceiling system of claim 1, wherein the bulb and the ceiling beam are made of steel.

3. The ceiling system of claim 1, wherein the first tooth, the second tooth, the bulb, and the ceiling beam are made of steel, and the steel of the first tooth and the second tooth is harder than the steel of the bulb and the ceiling beam.

4. The ceiling system of claim 1, wherein the first tooth and the second tooth are made of hardened steel.

5. A ceiling system comprising:
   a wall molding attached to a wall, the wall molding including a first vertical leg parallel to the wall and a second vertical leg perpendicular to the wall;
   a saddle connector including:
   (a) an inverted channel comprising a first sidewall and a second sidewall, the first sidewall opposing the second sidewall,
   (b) a first tooth in the first side wall that is opposite a first clear surface area on the second side wall, wherein the first tooth is made of hardened steel and is adapted to be forced into the inverted channel, thereby forming a second clear surface area on the first sidewall,
   (c) a second tooth in the second side wall that is opposite the second clear surface area, such that the first tooth and the second tooth are staggered along the first and second sidewalls, wherein the second tooth is made of hardened steel,
   (d) a bridge piece extending from the first inverted channel,
   (e) a back piece bent downwardly from the bridge piece, and
   (f) a lip punched out of the back piece, the lip adapted to hook between the wall and the first vertical leg of the wall molding to secure the saddle connector to the wall molding; and a ceiling beam including a bulb along the top of the ceiling beam, wherein the first tooth and the second tooth pierce the bulb, the bulb and ceiling beam made of steel and the steel of the first tooth and the second tooth is harder than the steel of the bulb and the ceiling beam, wherein the first clear surface area is capable of forming a support for a first jaw of a pair of manually operated pliers to force the first tooth into the bulb by a force from a second jaw of the pair of manually operated pliers, the first tooth forming the second clear surface area once forced into the bulb, and the second clear surface area is capable of forming a support for the first jaw of the pair of manually operated pliers to force the second tooth into the bulb by a force from the second jaw of the manually operated pliers.

* * * * *